United States Patent [19]

Flanagan et al.

[11] B 3,987,348

[45] Oct. 19, 1976

[54] PARTIALLY IMPREGNATED CAPACITOR

[75] Inventors: Robert J. Flanagan, Hudson Falls; Richard G. Conners; Richard C. Merrill, both of Glens Falls, all of N.Y.

[73] Assignee: General Electric Company, Hudson Falls, N.Y.

[22] Filed: Sept. 16, 1974

[21] Appl. No.: 506,461

[44] Published under the second Trial Voluntary Protest Program on January 20, 1976 as document No. B 506,461.

[52] U.S. Cl. .............................. 317/259; 317/258
[51] Int. Cl.² ...................................... H01G 4/22
[58] Field of Search ................... 317/258, 259, 260

[56] References Cited
UNITED STATES PATENTS

| | | |
|---|---|---|
| 2,492,210 | 12/1949 | Clark ................................ 317/258 |
| 2,597,429 | 5/1952 | Bailey ............................... 317/258 |
| 2,764,718 | 9/1956 | Peck ................................. 317/258 |
| 2,797,373 | 6/1957 | Peck ................................. 317/258 |
| 3,153,180 | 10/1964 | Bellmore ........................... 317/260 |
| 3,251,115 | 5/1966 | Pfeiffer ......................... 317/260 X |
| 3,391,313 | 7/1968 | Hevey ........................... 317/260 X |
| 3,457,478 | 7/1969 | Lehrer .............................. 317/260 |
| 3,754,173 | 8/1973 | Eustance .......................... 317/259 |
| 3,818,288 | 6/1974 | Wenzel ......................... 317/260 X |

Primary Examiner—E. A. Goldberg
Attorney, Agent, or Firm—J. J. Lichiello

[57] ABSTRACT

A wound AC capacitor is made of resin strips with the electrodes being metal films on resin strips. The capacitor is wound on a hard core and is partially impregnated with a non-halogenated liquid.

8 Claims, 5 Drawing Figures

PARTIALLY IMPREGNATED CAPACITOR

BACKGROUND OF THE INVENTION

This invention relates to metallized electrical capacitor and more particularly to a partially impregnated metallized capacitor suitable for application voltages of above about 250 volts AC.

An important failure mechanism in capacitors is failure due to the deleterious effects associated with corona discharge and subsequent arcing. Corona discharge usually occurs in voids and air spaces at capacitor voltages above about 400 volts AC and following Paschen's law*. However, AC capacitors are usually designed so that they have a corona level well above the rated voltage because of transitory overvoltages or surges. For example, a 250 volt AC capacitor usually has a corona start voltage level of above about 400 volts. In order to minimize corona, higher voltage capacitors are usually fully and completely impregnated with a dielectric liquid impregnant which occupies most, if not all, voids and spaces which are corona sites and thus raises the corona level.

*On Sparking Over in Air, Hydrogen and Carbon Dioxide Under the Potentials Corresponding to Various Pressures (in German), Friedrich Paschen, Wiedemann Annalan der Physik und Chemie, Vol. 37, (1889) 69-96.

For operation at voltages below about 250 volts AC, a dry or unimpregnated metallized capacitor may be employed. A metallized capacitor is one wherein the electrode is usually a metal such as aluminum which is vacuum deposited as a thin film on a solid dielectric. This kind of capacitor has the advantage of self healing characteristics, when electrical breakdown or failure occurs, because the thin electrode metal supporting the arc vaporizes to thereby extinguish the arc or remove the fault from the system. Metallized capacitors are additionally advantageous because at the lower voltages they use thinner and non critical dielectrics operating at lower stresses.

Dry metallized capacitors for voltages in the range of 250 to 750 volts AC, and particularly from about 350 to 750 volts AC, have not found wide acceptance because with thin dielectric films under high stress and self clearing feature is too severe and there is excessive electrode erosion with loss of capacitance. There is also excessive gas generation at these voltages, and the temperature rise in these capacitors is too great. Dielectric liquid impregnation of these high stress capacitors is undesirable not only because of the increased economic factor but also because the impregnants, in the self clearing action, generate excessive gas and erode the metallized film. Consequently, one finds dry metallized capacitors only at lower voltages and thicker dielectric systems, i.e., low voltage stress systems, and liquid impregnated capacitors at higher voltages. However, dry metallized capacitors with highly stressed dielectric systems are more economical and otherwise advantages for medium voltage, 250 to 750 volt, AC systems.

OBJECT OF THE INVENTION

It is therefore an object of this invention to provide an improved dry metallized capacitor.

It is another object of this invention to provide an improved dry metallized AC capacitor with a highly stressed dielectric system suitable for operation above about 250 volts AC.

It is a further object of this invention to provide a dry metallized AC capacitor utilizing only highly stressed polypropylene film as the dielectric and only metallized coatings on polypropylene film as the electrodes.

It is a further object of this invention to provide a dry metallized capacitor having a highly stressed dielectric system with dielectric liquid sealed or coated ends.

It is still another object of this invention to provide an improved hard roll solid core highly stressed dry metallized capacitor with liquid sealed or coated ends for voltages in the range of above 250 volts AC to about 750 volts AC operation.

SUMMARY

Briefly described, this invention in one of its preferred forms comprises a pair of aluminum metallized very thin polypropylene film strips which are very tightly wound on a hard cylindrical core into a round hard capacitor roll section which is substantially devoid of internal air spaces and voids. The roll section is inserted into a can or casing and the can is filled with a suitable dielectric liquid which essentially only coats the roll ends to suppress what is referred to as roll edge corona. A dry metallized high stress capacitor is thus provided which is suitable for AC operation at more than 250 volts AC.

BRIEF DESCRIPTION OF THE DRAWINGS

This invention will be better understood when taken in connection with the following description and drawings in which.

DISCUSSION OF PREFERRED EMBODIMENT

Figure 1:
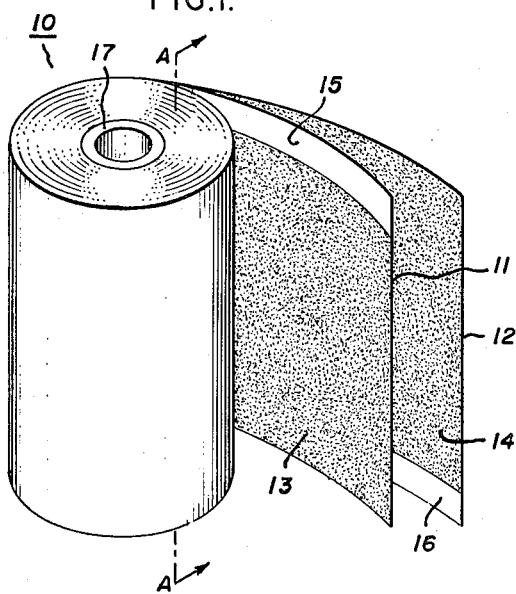
FIG. 1 illustrates an exemplary capacitor roll section of this invention partially unwound to show dielectric and electrode structure.

Referring now to FIG. 1, there is disclosed one preferred embodiment of this invention as a capacitor roll section 10. Roll section 10 comprises a pair of dielectric material strips 11 and 12 which have been metallized as illustrated by metallized surfaces or coatings 13 and 14. As is the usual practice, the strips 11 and 12 are metallized in a manner which leaves metal free margins 15 and 16 along opposite edges of the roll 10. In the winding process of roll 10, the strips 11 and 12 are laterally offset with respect to each other in order that each roll edge or end will display an offset with its metallized coatings at the edge of the strip. Therefore, suitable leads may be attached to the roll ends through utilization of the well known schooping process. There is minimal danger of the schooping material penetrating sufficiently into the roll edge to electrically short the other metallized surface because of the free margin construction.

An important principle of this invention is that the roll 10 must be extremely tightly wound to minimize any air space therein which would support deleterious corona discharge. This principle is accomplished in this invention by use of preferred materials and winding processes. More specifically, dielectric strips 11 and 12 are of a dense non porous material and for that reason may comprise various synthetic resin films such as, for example, polyesters, polycarbonates and polyolefins. Regardless of the kind of synthetic resin material used for these strips, they are better suited for this invention when they are relatively smooth and impervious to liquids, i.e., non porous, have a low modulus of elasticity and are dimensionally uniform. Paper materials and other porous materials are excluded from the practice of this invention because of their known porosity, since it is the intention of this invention to minimize any air space in the roll and to have very little, if any, initial liquid penetration into the roll structure. In one form of this invention, biaxially oriented isotactic polypropylene material was used for strips 11 and 12. This polypropylene material was free from bags and sags of uniform gauge and dimensionally stable at moderately elevated temperatures. The polypropylene strips used in many examples were of 32 gauge thickness and about 2 to 3 inches in width.

In order to wind strips 11 and 12 into a very tight roll, the roll must be provided with a fixed core structure not only to retain the integrity of the roll but also to prevent the collapse of the roll windings. As illustrated in FIG. 1, the roll 10 is provided with a hard core 17 which may be of a tubular or solid form and is coextensive through the roll. Core 17 is preferably of a hard non conductive material such as one of the synthetic resins, for example, polypropylene. Core 17 may also be a composite, i.e., a tube in which at a later time a desirable material is cast in place. In one practice of this invention, a core 17 was made up of polypropylene sheeting or strips of about 5.0 mil thickness which was tightly wound for about 5 to 10 turns to provide the proper rigidity. An advantage of this core is that it is wound on a standard machine arbor and the hard roll capacitor is wound on the core which is then easily removed from the machine arbor. Additionally, metallized dielectric strips and the core material are inserted into the machine arbor for simultaneous winding and this method eliminates the problems of affixing the strips to a premade core when high winding tensions are used. In the practice of this invention, core 17 is used as a single use arbor on which to wind hard roll 10 much in the manner described in U.S. Pat. No. 3,153,180, Bellmore, assigned to the same assignee as the present invention. The winding process to wind a hard roll 10 may be carried out on various winding machines, the one shown in U.S. Pat. No. 2,328,520, West, assigned to the same assignee of the present invention being one example.

An important factor of this invention is the definition of a hard roll capacitor. The hard roll is a roll which is wound so tightly as to make later penetration or impregnation by the dielectric liquid deeply into the roll a most difficult and slow process. In fact, impregnation which proceeds into the roll center or substantially away from the roll edges is neither necessary nor desirable. The hard roll is wound sufficiently tight to exclude essentially all air space or voids between the turns and, therefore, excludes potential corona sites. This air space wherever it occurs is denoted as space factor, i.e., the percent difference in volume between a theoretically solid roll 10 and the actual roll 10 as wound. In the practice of the preferred form of this invention as described, the space factor should be within the range of from about 0 to 0.5 percent and preferably from 0 to about 0.3 percent. This is accomplished by providing a winding tension of at least 200 grams, and preferably from 600 to 900 grams per inch of film width per mil thickness of biaxially oriented isotactic polypropylene film. For example, a film strip of 3 inches width and 0.32 mils thick, a minimum tension is 192 grams, and a preferred tension is from 576 to 864 grams.

The hard roll which is taken from the winding machine or from the schooping process is then subjected to a high temperature heat stabilizing process to further decrease the space factor. For example, with a roll 10 utilizing the above polypropylene strips, the rolls are loaded into an oven and the oven temperature is raised above about 105°C, and maintained at that level for several hours preferably from about 4 hours to 16 hours. The upper limit of this treatment is safely below the softening temperature of the polypropylene, a range of 110° to 120°C being found satisfactory. It is important that the temperatures indicated be those temperatures from deep within the roll. All polypropylene in the roll should be exposed to the heat shrinking process, and the temperature should be correlated to this factor. The temperature treatment may require in some cases a slightly higher elevated temperature in the oven or a higher oven temperature over a longer period of time so that all parts of a capacitor are brought up to a desired temperature in the ranges given. However, the temperature may differ somewhat between the outside and inner parts of a roll. The purpose of this treatment is to heat set the polypropylene in the roll, to shrink the roll to further reduce any void size in the roll below the critical value or size as defined by Paschen's Law.

This kind of heat treatment is only demonstrably and clearly effective where the capacitor electrode also has the kind of structure which will permit shrinkage. It was found that self supporting electrode foils, in combination with separate polypropylene strips, i.e., aluminum foils, were not applicable to this invention because the foil structure would not shrink and therefore prevented the heat treatment from shrinking the resin film in the desired manner to eliminate air space. A preferred electrode structure is a metallized structure, for example, where a metal such as aluminum or zinc and the like is vacuum deposited directly on a film strip. This kind of electrode structure was complementary to film shrinkage in the roll. Other methods of depositing or coating or otherwise making a film strip conductive may be employed in the invention so long as the structure does not inhibit the shrinking or the reduction of an air space by shrinking. In this connection, other kinds of polypropylene film are available which are more heat shrinkable, or more heat shrinkable in one direction than another. Most of the heat shrinking is desired to take place in the direction of the roll winding, i.e., a shortening of the longitudinal dimension or length of the strips. Polypropylene is more shrinkable when it is prestretched, i.e., oriented, although the high winding tension contributes to this effect. The result is a roll under considerable hoop tension both before and after heat treatment.

The hard roll of this invention after heat treatment is an extremely rigid structure that cannot easily be deformed. In fact, in order to preserve the rigidity and the low space factor, the hard roll is utilized in its essentially cylindrical form. It is not flattened as such capacitors usually are and therefore may be used with a cylindrical can when so desired.

Figure 2:
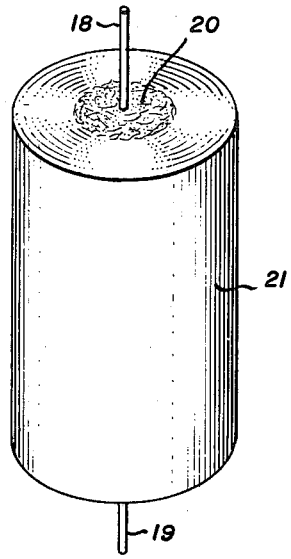
FIG. 2 illustrates the hard roll of this invention to which capacitor leads are attached.

Suitable electrical leads may be attached to the hard roll section of this invention by various means. One preferred form is illustrated in FIG. 2. Referring now to FIG. 2, electrical leads 18 and 19 are attached to opposite ends of the capacitor hard roll 21 through means of schooping 20. An exemplary schooping process is disclosed in U.S. Pat. No. 3,256,472, Centurioni, assigned the same assignee as the present invention. The schooping may be predeterminedly disposed or positioned so that openings into a tubular core 17 are provided.

Other methods of bonding or mechanically affixing of leads may also be employed in this invention. A modified flag means may also be employed so long as the flag does not introduce a large void in the roll. One modified flag means which minimizes voids is illustrated in FIG. 3.

Figure 3:
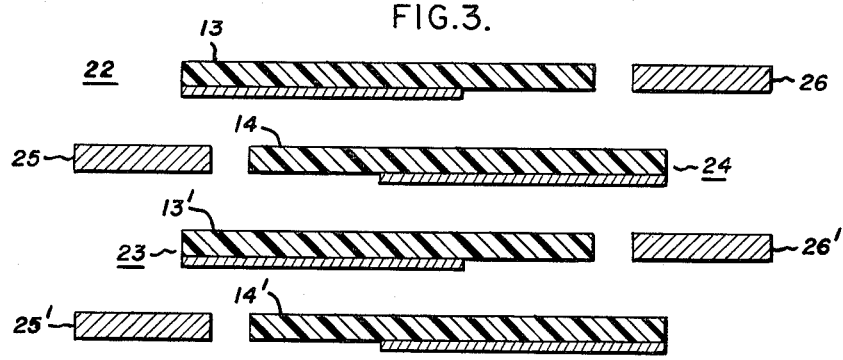
FIG. 3 is a partial sectional view of a modification of the dielectric system of FIG. 1.

In FIG. 3, partial roll section 22 is a transverse sectional view taken along line AA of FIG. 1 but limited to a small section of that roll. In FIG. 3, the dielectric structure comprises offset single metallized polypropylene strips 13, 14, $13^1$, $14^1$, etc. arranged in the same manner as in FIG. 1. At each roll edge 23 and 24, there extends from the roll the lateral edge of additional foil strips or flags 25 and 26. Strips 25 and 26 are narrow ribbon of foil which are inserted or interleaved into the roll during the winding process. As illustrated, the flage strips 25 and 26 abut the edges of the metallized polypropylene strips 13 and 14 and make large area electrical contact with the respective overlying metallized coatings thereon. Since these flag strips are not in fact interleaved between adjacent strips 13 and 14 but between next adjacent strips 13 and $13^1$, and 14 and $14^1$, and since they abut the ends of polypropylene strips 13 and 14, they add no significant bulk to the roll. Consequently, heat shrinking is equally effective to remove and reduce voids in the roll. At the same time, lead connections are advantageously made to the flags 25 and 26. The same procedure can also be applied where the strips 13 and 14 are not offset but this requires that the flags be inserted between adjacent layers and some increase in diameter and voids will occur.

It was found that hard roll capacitors made by the teachings of this invention as illustrated in FIG. 1 and 2 operated effectively at AC voltages at 250 volts and greater. Surprisingly, these capacitors were not deleteriously affected by corona discharge in spite of the use of very thin polypropylene film at stresses above 1200 volts per mil. Previously it was believed that such a capacitor was unsuitable because of short life characteristics brought about by corona discharge. However, in this invention the hard roll has reduced the space factor to below the values which supports deleterious corona and, in addition, forces are set up in the winding and shrinking of the roll tending to further constrict any air spaces.

However, in some applications, particularly the higher voltage ones, some corona problems occur at the roll edges or ends. The roll edges of capacitor rolls are critical areas for corona because of the proximity of the sharp edges which contribute to greater stress concentrations. This problem was overcome by placing the hard roll section 10 in a casing or can and utilizing a suitable capacitor compatible dielectric liquid to coat or seal the roll edges. It is not the intention on the use of this dielectric liquid to have the liquid initially penetrate deep within the roll. Impregnation in the usual sense or essentially complete impregnation as defined in U.S. Pat. No. 3,363,156, Cox, are made unnecessary in this invention and in fact undesirable.

The dielectric liquid is used only to coat, seal or insulate the roll edges and to act as a heat transfer during operation of the capacitor. This latter function is particularly desirable and necessary to provide a long life for a capacitor which is enclosed in a casing. If the capacitor does not have good heat contact relationship in the can, the temperature build up is significant. The dielectric liquid not only seals off corona areas at the roll edges but acts as an excellent heat transfer medium between the electrodes and the casing. When a tubular core 17 is employed, it is filled with the impregnant fluid and a further heat transfer path is obtained.

Among the preferred edge liquids for metallized polypropylene film are the esters, particularly castor oil and the phthalate esters such as dioctyl phthalate. The effectiveness of these materials are increased when an epoxide scavenger material is dissolved therein. The chlorinated diphenyls are most undesirable and are not useable at present in this invention because they permeate and soften the film and cause separation of the electrode. The ordinary self healing arcing in metallized capacitors also results in excessive conductive by-products from the chlorinated diphenyls.

Dielectric liquid penetration should be limited to slightly beyond the roll edge and no penetration need occur within the roll. In order to further limit this penetration, suitable gelling agents may be added to the impregnant. Analysis of a number of hard rolls of this invention which have been unwound show that no significant dielectric liquid permeation has taken place, and the interior of the roll is quite dry. In fact, such dielectric liquid impregnants as castor oil and phthalate esters have been found to penetrate only a few mils into the roll. The hard roll of the present invention, because of its hardness and heat treatment and the exclusion of porous materials, inhibits the kind of impregnation in which an impregnant passes throughout the roll either between the various strips or through the strip materials. In unwinding a hard roll of this invention one observes, in looking at a section between roll edges, a central section extending over most of the distance between roll edges which is dry and unimpregnated. At the roll edges there will be found a very narrow band or margin, of few mils in width, of an area that is wetted with the dielectric liquid.

Extensive penetration of the dielectric liquid has not been found to be harmful under certain conditions. Some capacitors produced according to this invention shown, after extended life testing and upon tear down analysis, that the dielectric liquid has seeped into the strip ends of the roll at the finish of the roll. This seepage may occur through several roll turns. Additionally where there may be some defect or loose portion in the roll seepage may occur from the roll edge fairly deeply into the roll at the defect site. These kinds of limited and isolated penetrations have not been found to be harmful to the capacitor.

At the same time during the life of the capacitor at operating temperatures and voltage dielectric liquid penetration is occurring at a very limited rate and volume and may, over many hundreds or thousands of hours of operation, prove to be extensive although the available volume of liquid is quite limited. This permeation has not been found to be troublesome because of its slow rate and because it was initially unnecessary for effective capacitor operation and no reliance is placed thereon.

An important advantage of the hard roll capacitor of this invention is that the film employed can be utilized in thinner gauges and at higher voltage stresses. For example, capacitors made in accordance with the teachings of this invention have utilized polypropylene film at AC stresses ranging from 1200 to 1750 volts per mil thickness of film. This provides a much smaller and more economical capacitor at stresses usually thought unattainable unless the unit was fully impregnated. The hard roll capacitor is most effective where the film stress is above about 1200 volts per mil thickness and the rated voltage of the capacitor is at least about 350 volts AC.

Figure 4:
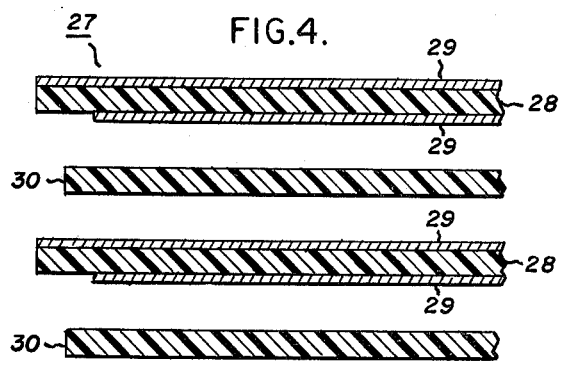
FIG. 4 is a doubly metallized electrode version of the system of FIG. 3.

This invention can use several dielectric systems in addition to those disclosed. A further modified system is shown in FIG. 4. In FIG. 4, the dielectric system 27 comprises spaced polypropylene strips 28 having each side coated (doubly metallized) with a metal coating 29 and an intermediate polypropylene strip 30. Either the lead attachment of FIG. 2 or 3 may be used with this structure.

Figure 5:
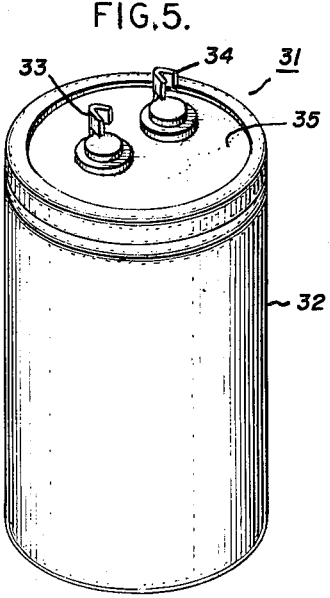
FIG. 5 illustrates the capacitor roll of this invention suitably encased and sealed in a can.

The hard roll capacitor of this invention is preferably sealed into a can or casing. A typical unit is illustrated in FIG. 5. In FIG. 5, capacitor unit 31 comprises a metal can or casing 32 fitted with terminals 33 and 34. The capacitor roll of FIGS. 1 and 2 is contained in the can and one of the leads of FIG. 2 may be bent up to pass through the core center or may pass upwardly along the side of the roll so that both leads 18 and 19 can make contact with the terminals 33 and 34.

A metallized capacitor is one which is subject to gas generation during its operation. Miscellaneous arcing which occurs in a metallized capacitor burns away or evaporates the metallized surface and the arc is therefore self extinguishing. In this burning or eroding gas is generated in the capacitor and must be allowed to escape. For this reason, most metallized capacitors either are not sealed, or there is a significant spacing within the casing to absorb pressure build up. It has been found that in the present invention, where the capacitor is sealed in a small unevacuated casing, gas generation can cause pressure build up of combustible gases. In this condition, the capacitor is prone to a violent rupture due to internal combustion of these gases. On the other hand, when the capacitor of this invention is sealed in a casing which is completely filled with the dielectric liquid, a rupture failure is of considerably reduced effect, mostly because there is a significantly lesser quantity of a combustible mixture being present. It is therefore preferred in this invention that the casing be completely filled with the dielectric liquid. When this filling takes place under vacuum, a considerable amount of undesirable oxygen is also removed from the casing.

Specific examples of the practice of this invention are given in the following examples.

EXAMPLE I

Several capacitors were made up as herein described. The core was a ⅝ inch diameter solid resin cylinder. The capacitor roll section structure was that as described in FIG. 1 with aluminum metallized polypropylene film strips 2½ inches wide and 0.40 mil thickness. The capacitors were heat treated as herein described by being dried under vacuum at 115°C for 16 hours. Some of these capacitors were placed in a can and the can filled with either dioctyl phthalate or castor oil so that the roll edges were submerged in the dielectric liquid. One percent (1 percent) by weight of Dow 330 epoxide was added to the liquid impregnant. The nominal capacitance for these units is 13 uf. They were satisfactorily tested at 550 VAC and 80°C, and after 280 hours of test, they evidenced a slight increase in capacitance.

EXAMPLE II

The above Example I was repeated except that capacitors were vacuum dried at 75°C for 16 hours. Thereafter the units were back filled with castor oil and epoxide at 75°C and remained at this temperature for 16 hours. The capacitors were tested at 550 volts AC at 80°C. The stress on the film was 1375 volts per mil. Tear down analyses indicated that the castor oil penetration was limited to the roll edges and the interior of the roll was dry.

EXAMPLE III

A further number of units as herein described were made up using film widths of from 1.87 inch to 3.87 and film thicknesses of 25, 32, 38, and 40 gauge. Film stresses were from 1370 volts per mil to 1720 volts per mil. These capacitors were filled with castor oil epoxide and were subjected to 1000 hours of life testing at 80°C. The capacitance drop over this period of time was small.

EXAMPLE IV

Representative numbers of preferred hard roll capacitors of this invention as illustrated in FIGS. 1 and 2 were made and tested for heat shrinking advantages as noted in the following Table I.

TABLE I

| | No. Failed/ No. Tested | % Cap. Loss | Life Hours |
| --- | --- | --- | --- |
| Not heat set | 0/5 | 2.9 | 500 |
| heat set at 120°C | 0/5 | 1.8 | 500 |

TABLE II

| | | | |
| --- | --- | --- | --- |
| Not heat set but filled at 75 to 85°C | 6/10 | 1.75 | 5000 |
| Heat set at 100°C | 4/10 | 0.45 | 5000 |
| Heat set at 125°C | 2/9 | 0.33 | 5000 |

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. A capacitor having a voltage rating in the range of from above about 350 volts AC to 750 volts AC comprising in combination
    a. a capacitor roll section having a dielectric and electrode system which consists solely of synthetic resin strips some of which have metal film coatings thereon as the sole electrode structure,
    b. said dielectric strips being of less than 0.5 mils thickness to bear a voltage stress of from above about 1200 to 1750 volts per mil at the rated voltage of the capacitor,
c. said strips being wound under heavy tension on a hard cylindrical core to provide a hard round capacitor roll section highly resistant to dielectric liquid penetration at the roll edges,
d. a sealed casing containing said roll section,
e. and a non halogenated dielectric liquid filling said can and submerging said roll edges, and
f. said roll section having a substantially dry central section which predominates the distance between the roll edges which is not penetrated by the dielectric liquid, and narrow margin sections at said edges which are wet by the dielectric liquid.

2. The invention as recited in claim 1 wherein at least one of said strips comprises heat shrinkable polypropylene.
3. The invention as recited in claim 1 wherein said roll is under significant hoop tension.
4. The invention as recited in claim 1 wherein said core is a solid core of a dense non conductive material.
5. The invention as recited in claim 1 wherein said core is a polypropylene tube.
6. The invention as recited in claim 3 wherein said capacitor is essentially cylindrical.
7. The invention as recited in claim 3 wherein said liquid is an ester.
8. The invention as recited in claim 3 wherein said epoxide stabilizer is added to said dielectric liquid.

* * * * *